US009134043B2

(12) United States Patent
Plotkin et al.

(10) Patent No.: US 9,134,043 B2
(45) Date of Patent: Sep. 15, 2015

(54) HEAT TRANSFER PASSES FOR SOLAR BOILERS

(75) Inventors: Andrew Plotkin, Worcester, MA (US); Craig Gillum, West Boylston, MA (US)

(73) Assignee: Babcock Power Services Inc., Worcester, MA (US)

( * ) Notice: Subject to any disclaimer, the term of this patent is extended or adjusted under 35 U.S.C. 154(b) by 713 days.

(21) Appl. No.: 13/007,262

(22) Filed: Jan. 14, 2011

(65) Prior Publication Data

US 2011/0114085 A1    May 19, 2011

Related U.S. Application Data

(63) Continuation-in-part of application No. 12/620,109, filed on Nov. 17, 2009, and a continuation-in-part of application No. 12/547,650, filed on Aug. 26, 2009, now Pat. No. 8,397,710.

(60) Provisional application No. 61/151,984, filed on Feb. 12, 2009, provisional application No. 61/152,011, (Continued)

(51) Int. Cl.
  *F24J 2/07*    (2006.01)
  *F24J 2/24*    (2006.01)

(52) U.S. Cl.
  CPC .. *F24J 2/245* (2013.01); *F24J 2/07* (2013.01); *Y02E 10/41* (2013.01); *Y02E 10/44* (2013.01); *Y02E 10/46* (2013.01)

(58) Field of Classification Search
  CPC ................ F24J 2/04; F24J 2/24; F24J 2/248; F24J 2/10; F24J 2/4621; F24J 2/4625; F24J 2002/4601

USPC ........ 126/704, 651, 640, 663, 688; 60/641.8, 60/641.11
  See application file for complete search history.

(56) References Cited

U.S. PATENT DOCUMENTS

| 2,383,234 A | 8/1945 | Barnes |
| 2,882,871 A | 4/1959 | Koch |
| 3,197,343 A | 7/1965 | Palmatier |
| 3,208,877 A | 9/1965 | Merry |

(Continued)

FOREIGN PATENT DOCUMENTS

| FR | 2501839 A1 | 9/1982 |
| GB | 2060860 A | 5/1981 |

(Continued)

OTHER PUBLICATIONS

Israel Patent Office, Official Action for Israel Patent Application No. 217405 dated Nov. 7, 2013.

(Continued)

*Primary Examiner* — Gregory Huson
*Assistant Examiner* — Daniel E Namay
(74) *Attorney, Agent, or Firm* — Locke Lord LLP; Joshua L. Jones; Alicia J. Esposito

(57) ABSTRACT

A boiler for a solar receiver includes a plurality of boiler walls arranged end to end surrounding a boiler interior space. Each wall includes a plurality of side by side solar receiver panels. The panels are fluidly connected to one another by way of a steam circuit. The boiler also includes a plurality of conduits each forming a portion of the steam circuit fluidly connecting the panels. The panels and conduits form a plurality of heat transfer passes in the steam circuit. In certain embodiments, the steam circuit includes between two and ten passes, inclusively.

15 Claims, 9 Drawing Sheets

Related U.S. Application Data filed on Feb. 12, 2009, provisional application No. 61/152,035, filed on Feb. 12, 2009, provisional application No. 61/152,049, filed on Feb. 12, 2009, provisional application No. 61/152,077, filed on Feb. 12, 2009, provisional application No. 61/152,114, filed on Feb. 12, 2009, provisional application No. 61/152,286, filed on Feb. 13, 2009.

(56) References Cited

U.S. PATENT DOCUMENTS

| | | | | |
|---|---|---|---|---|
| 3,325,312 | A | 6/1967 | Sonntag, Jr. | |
| 3,450,192 | A | 6/1969 | Hay | |
| 3,459,597 | A | 8/1969 | Baron | |
| 3,464,402 | A | 9/1969 | Collura | |
| 3,822,692 | A * | 7/1974 | Demarest | 126/591 |
| 3,823,703 | A | 7/1974 | Lanciault | |
| 3,893,506 | A | 7/1975 | Laing | |
| 3,924,604 | A | 12/1975 | Anderson | |
| 3,927,659 | A | 12/1975 | Blake et al. | |
| 3,951,108 | A | 4/1976 | Rees | |
| 3,968,652 | A | 7/1976 | Chevalier | |
| 3,991,742 | A | 11/1976 | Gerber | |
| 3,995,804 | A | 12/1976 | Folds et al. | |
| 4,003,366 | A | 1/1977 | Lightfoot | |
| 4,037,639 | A | 7/1977 | Jones | |
| 4,088,266 | A | 5/1978 | Keyes | |
| 4,094,147 | A | 6/1978 | Alleau et al. | |
| 4,112,921 | A | 9/1978 | MacCracken | |
| 4,120,288 | A | 10/1978 | Barrett | |
| 4,127,102 | A | 11/1978 | Berman | |
| 4,127,103 | A | 11/1978 | Klank et al. | |
| 4,128,096 | A | 12/1978 | Katz | |
| 4,136,674 | A * | 1/1979 | Korr | 126/607 |
| 4,191,246 | A | 3/1980 | Cassell | |
| 4,204,523 | A | 5/1980 | Rothe | |
| 4,205,658 | A | 6/1980 | Clark | |
| 4,210,122 | A | 7/1980 | Artweger | |
| 4,215,676 | A | 8/1980 | Gilliam | |
| 4,237,861 | A | 12/1980 | Fayard et al. | |
| 4,245,618 | A * | 1/1981 | Wiener | 126/643 |
| 4,253,801 | A | 3/1981 | O'Hare | |
| 4,257,477 | A | 3/1981 | Maloney | |
| 4,261,330 | A | 4/1981 | Reinisch | |
| 4,265,223 | A | 5/1981 | Miserlis et al. | |
| 4,269,172 | A | 5/1981 | Parker et al. | |
| 4,273,100 | A | 6/1981 | Cogliano | |
| 4,280,483 | A | 7/1981 | Schaffer | |
| 4,289,114 | A * | 9/1981 | Zadiraka | 126/587 |
| 4,296,730 | A * | 10/1981 | Zadiraka | 126/592 |
| 4,296,733 | A | 10/1981 | Saunders | |
| 4,312,687 | A | 1/1982 | Sigworth, Jr. | |
| 4,313,304 | A | 2/1982 | Hunt | |
| 4,320,663 | A | 3/1982 | Francia | |
| 4,324,229 | A | 4/1982 | Risser | |
| 4,338,991 | A | 7/1982 | Sigworth, Jr. | |
| 4,350,374 | A | 9/1982 | Brollo | |
| 4,353,356 | A | 10/1982 | Vandenbossche | |
| 4,359,043 | A | 11/1982 | Dominique et al. | |
| 4,367,726 | A | 1/1983 | Maes, Jr. | |
| 4,371,035 | A | 2/1983 | Soligno | |
| 4,373,512 | A | 2/1983 | Hirt | |
| 4,380,996 | A | 4/1983 | Mengeringhausen | |
| 4,384,550 | A * | 5/1983 | Miller | 122/510 |
| 4,394,859 | A | 7/1983 | Drost | |
| 4,404,960 | A | 9/1983 | Laing | |
| 4,416,265 | A | 11/1983 | Wallace | |
| 4,428,361 | A | 1/1984 | Straza | |
| 4,432,341 | A | 2/1984 | Howe et al. | |
| 4,454,863 | A | 6/1984 | Brown et al. | |
| 4,485,803 | A * | 12/1984 | Wiener | 126/591 |
| 4,503,903 | A | 3/1985 | Kramer | |
| 4,512,336 | A * | 4/1985 | Wiener | 126/651 |
| 4,535,755 | A | 8/1985 | Roberts | |
| 4,546,758 | A * | 10/1985 | Ebernard | 126/635 |
| 4,569,331 | A | 2/1986 | Tani et al. | |
| 4,615,381 | A | 10/1986 | Maloney | |
| 4,653,470 | A | 3/1987 | Carli et al. | |
| 4,660,630 | A | 4/1987 | Cunningham et al. | |
| 4,665,894 | A | 5/1987 | Juhasz | |
| 4,712,338 | A | 12/1987 | Trickel | |
| 4,768,345 | A | 9/1988 | Kardas | |
| 4,825,664 | A * | 5/1989 | Vandervaart | 62/324.1 |
| 4,832,119 | A | 5/1989 | Bloor et al. | |
| 4,867,133 | A | 9/1989 | Sadler | |
| 4,869,234 | A * | 9/1989 | Rapozo | 126/656 |
| 4,946,512 | A | 8/1990 | Fukuroi et al. | |
| 4,964,395 | A * | 10/1990 | Salgado et al. | 126/586 |
| 4,972,806 | A | 11/1990 | Marsault | |
| 5,163,821 | A | 11/1992 | Kelly et al. | |
| 5,174,128 | A | 12/1992 | Bourne et al. | |
| 5,201,282 | A | 4/1993 | Albrecht | |
| 5,217,000 | A | 6/1993 | Pierce-Bjorklund | |
| 5,342,016 | A | 8/1994 | Marsault et al. | |
| 5,368,092 | A | 11/1994 | Rearden et al. | |
| 5,404,937 | A | 4/1995 | Assaf et al. | |
| 5,417,052 | A | 5/1995 | Bharathan et al. | |
| 5,444,972 | A | 8/1995 | Moore | |
| 5,482,233 | A | 1/1996 | Marko et al. | |
| 5,694,774 | A | 12/1997 | Drucker | |
| 5,727,379 | A | 3/1998 | Cohn | |
| 5,823,176 | A | 10/1998 | Harris | |
| 5,850,831 | A * | 12/1998 | Marko | 126/645 |
| 5,857,322 | A | 1/1999 | Cohn | |
| 5,862,800 | A * | 1/1999 | Marko | 126/680 |
| 5,881,456 | A | 3/1999 | Bergins et al. | |
| 5,943,985 | A | 8/1999 | Hartman | |
| 6,126,120 | A | 10/2000 | Quaranta et al. | |
| 6,155,339 | A | 12/2000 | Grapengater | |
| 6,173,927 | B1 | 1/2001 | Delsol | |
| 6,240,156 | B1 | 5/2001 | Matsumoto et al. | |
| 6,301,928 | B1 | 10/2001 | Tanatsugu et al. | |
| 6,434,942 | B1 | 8/2002 | Charlton | |
| 6,487,859 | B2 | 12/2002 | Mehos et al. | |
| 6,497,102 | B2 | 12/2002 | Liebig | |
| 6,532,953 | B1 | 3/2003 | Blackmon et al. | |
| 6,668,555 | B1 | 12/2003 | Moriarty | |
| 6,701,711 | B1 * | 3/2004 | Litwin | 60/641.11 |
| 6,708,687 | B2 | 3/2004 | Blackmon, Jr. et al. | |
| 6,736,134 | B2 | 5/2004 | Marko | |
| 6,913,015 | B2 | 7/2005 | Pajk | |
| 6,926,440 | B2 * | 8/2005 | Litwin | 374/124 |
| 6,931,851 | B2 * | 8/2005 | Litwin | 60/641.11 |
| 6,957,536 | B2 * | 10/2005 | Litwin et al. | 60/641.8 |
| 7,011,086 | B2 * | 3/2006 | Litwin | 126/651 |
| 7,600,350 | B2 | 10/2009 | Braunstein | |
| 7,640,746 | B2 * | 1/2010 | Skowronski et al. | 60/641.8 |
| 7,690,377 | B2 * | 4/2010 | Goldman et al. | 126/655 |
| 7,806,377 | B2 | 10/2010 | Strizki | |
| 8,001,960 | B2 * | 8/2011 | Gilon et al. | 126/600 |
| 2001/0010222 | A1 | 8/2001 | Prueitt | |
| 2002/0029869 | A1 | 3/2002 | Kodumudi et al. | |
| 2003/0041856 | A1 | 3/2003 | Blackmon et al. | |
| 2004/0035111 | A1 | 2/2004 | Ven et al. | |
| 2004/0108099 | A1 * | 6/2004 | Litwin | 165/48.2 |
| 2004/0112374 | A1 | 6/2004 | Litwin | |
| 2004/0139961 | A1 | 7/2004 | Blackmon et al. | |
| 2004/0244376 | A1 | 12/2004 | Litwin et al. | |
| 2004/0251002 | A1 | 12/2004 | Reichle et al. | |
| 2004/0255571 | A1 | 12/2004 | Fetescu et al. | |
| 2005/0016524 | A1 | 1/2005 | Broatch | |
| 2006/0225863 | A1 | 10/2006 | Levin | |
| 2006/0260314 | A1 | 11/2006 | Kincaid et al. | |
| 2007/0089775 | A1 | 4/2007 | Lasich | |
| 2007/0119718 | A1 | 5/2007 | Gibson et al. | |
| 2007/0227531 | A1 | 10/2007 | Garcia Cors et al. | |
| 2007/0295382 | A1 | 12/2007 | Oak | |
| 2008/0000231 | A1 | 1/2008 | Litwin et al. | |
| 2008/0022685 | A1 | 1/2008 | Zhu | |
| 2008/0053523 | A1 | 3/2008 | Brown et al. | |
| 2008/0078378 | A1 | 4/2008 | Zhu | |
| 2008/0092551 | A1 | 4/2008 | Skowronski | |
| 2008/0256953 | A1 | 10/2008 | Arkas et al. | |

(56) References Cited

U.S. PATENT DOCUMENTS

| | | | |
|---|---|---|---|
| 2008/0302357 A1 | 12/2008 | DeNault | |
| 2009/0014057 A1 | 1/2009 | Croft et al. | |
| 2009/0038608 A1* | 2/2009 | Caldwell | 126/600 |
| 2009/0101134 A1 | 4/2009 | Merrett | |
| 2009/0107146 A1 | 4/2009 | Lin | |
| 2009/0114269 A1 | 5/2009 | Fletcher et al. | |
| 2009/0114270 A1 | 5/2009 | Stancel | |
| 2009/0199557 A1 | 8/2009 | Bennett | |
| 2009/0250051 A1 | 10/2009 | Lata Perez | |
| 2009/0260359 A1 | 10/2009 | Palkes | |
| 2009/0276993 A1 | 11/2009 | Fedock et al. | |
| 2010/0199978 A1 | 8/2010 | Plotkin et al. | |
| 2010/0229853 A1 | 9/2010 | Vandal et al. | |
| 2010/0236183 A1 | 9/2010 | Cusson et al. | |

FOREIGN PATENT DOCUMENTS

| | | |
|---|---|---|
| JP | 53131309 A | 11/1978 |
| JP | 08326223 A | 12/1996 |
| WO | WO-2008154599 A1 | 12/2008 |

OTHER PUBLICATIONS

Spanish Patent Office, Result of the Substantive Examination for Spanish Patent Application No. 201230045 dated Dec. 10, 2013.
Spanish Search Report dated May 22, 2013 for Spanish Application No. 201230045.
U.S. Appl. No. 60/943,096, Kroizer.
International Search Report and Written Opinion, dated Aug. 30, 2010 for PCT/US2010/023124.
International Search Report and Written Opinion, dated Aug. 31, 2010 for PCT/US2010/023165.
International Search Report and Written Opinion, dated Oct. 13, 2010 for PCT/US2010/023622.
International Search Report and Written Opinion, dated Oct. 13, 2010 for PCT/US2010/023826.
International Search Report and Written Opinion, dated Dec. 13, 2010 for PCT/US2010/023367.
International Search Report and Written Opinion, dated Dec. 13, 2010 for PCT/US2010/023500.

* cited by examiner

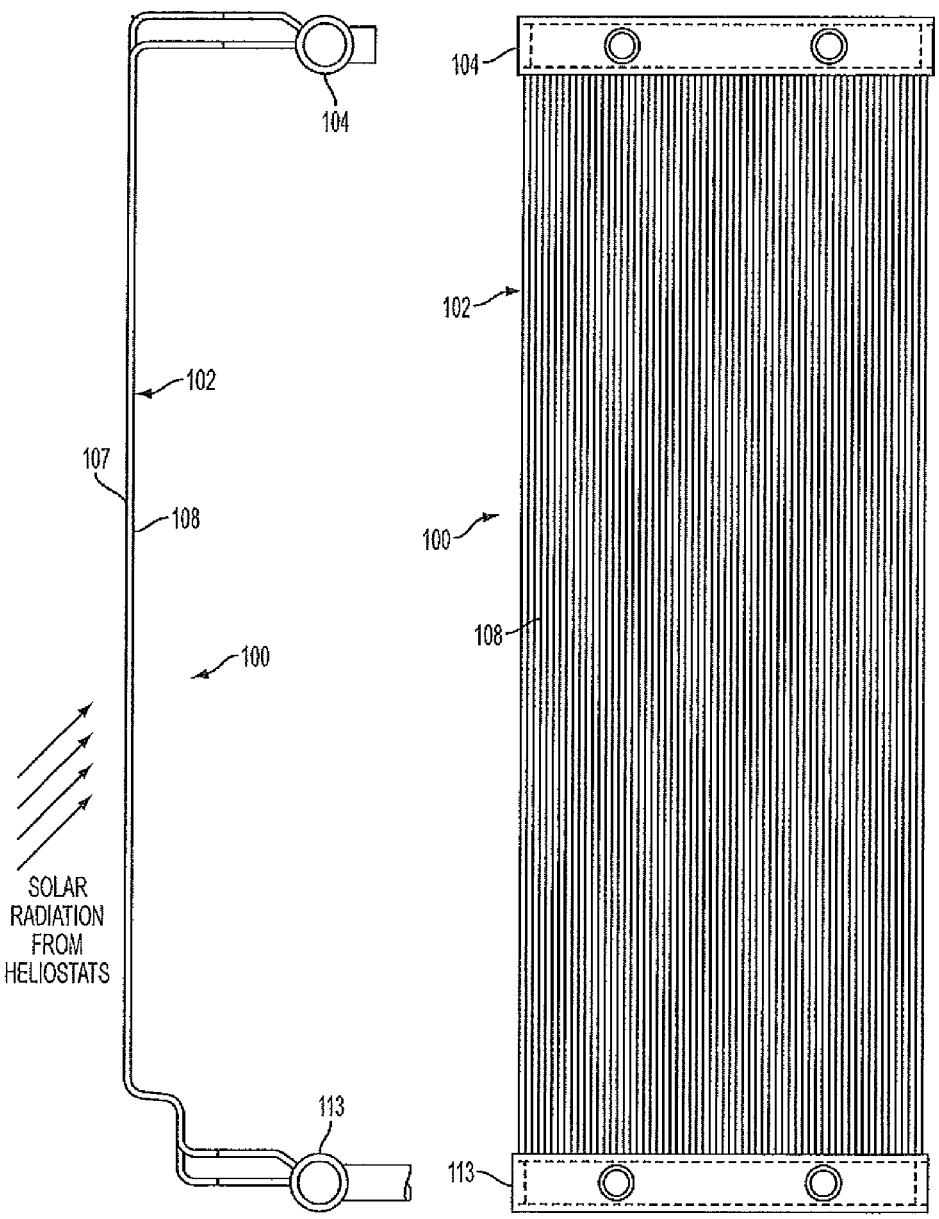

HEAT TRANSFER PASSES FOR SOLAR BOILERS

CROSS-REFERENCE TO RELATED APPLICATIONS

This application is a continuation in part of U.S. patent application Ser. No. 12/620,109 filed Nov. 17, 2009. This application is also a continuation in part of U.S. patent application Ser. No. 12/547,650 filed Aug. 26, 2009. Each of U.S. patent application Ser. Nos. 12/620,109 and 12/547,650 claims priority to U.S. Provisional application No. 61/151,984, filed Feb. 12, 2009, to U.S. Provisional application No. 61/152,011, filed Feb. 12, 2009, to U.S. Provisional application No. 61/152,035, filed Feb. 12, 2009, to U.S. Provisional application No. 61/152,049, filed Feb. 12, 2009, to U.S. Provisional application No. 61/152,077, filed Feb. 12, 2009, to U.S. Provisional application No. 61/152,114, filed Feb. 12, 2009, and to U.S. Provisional application No. 61/152,286, filed Feb. 13, 2009. Each of the applications referenced above is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be produced without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is little or no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar production can be increased and simplified by using water/steam as the only working fluid in a receiver that is a boiler. This can eliminate the need for an inefficient heat exchanger between two different working fluids. This development has lead to new challenges in handling the intense solar heat without damage to the system. In a solar boiler, heat transfer rates can reach levels around 2-3 times the heat transfer rate of a typical fossil fuel fired boiler. This high heat transfer rate intensifies problems related to maintaining even heating and flow distribution throughout known designs of boiler panels. If flow through a portion of a receiver panel is insufficient when using water/steam as a working fluid, overheating can result for that panel portion. Such overheating can result in damage or failure of the panel and its constituent tubes if the temperatures are allowed to become severe.

Compared to typical fuel fired boilers, solar boilers have greatly varying heat inputs due to the inconsistencies in incident solar radiation. In a typical boiler the flue gas around any given tube section is nearly the same temperature, which means that the tubes absorb relatively similar amounts of energy regardless of location. Solar boilers, however, have heat input that can vary up to 50% over a relatively small area. In solar boilers made up of just a few tubes that bend around the entire structure, as in traditional fuel fired boilers, the fluid from the tubes exits at greatly different temperatures which create problematic metal temperatures and steam temperatures. This problem increases with boiler size, i.e., the bigger the boiler, the greater the temperature imbalance. This is especially true over a solar boiler panel or pass which is very wide or has a larger area, because the heat flux is highly non-uniform and can create large temperature differences in the tubes.

While the known systems of solar power production have generally been considered satisfactory for their intended purposes, there has remained a need in the art for solar receivers that can improve heat and fluid flow distribution. There also has remained a need in the art for such solar receivers that are easy to make and use. The present invention provides a solution to these problems.

SUMMARY OF THE INVENTION

The subject invention is directed to a new and useful boiler for a solar receiver. A plurality of boiler walls arranged end to end surrounds a boiler interior space. Each wall includes a plurality of side by side solar receiver panels. The panels are fluidly connected to one another by way of a steam circuit. The boiler also includes a plurality of conduits each forming a portion of the steam circuit fluidly connecting the panels. The panels and conduits form a plurality of heat transfer passes in the steam circuit.

In certain embodiments, the steam circuit includes between two and ten passes, inclusively. The steam circuit can include four passes and each pass can include a pair of parallel panels, wherein the panels of each pair of parallel panels are substantially coplanar. It is also contemplated that each pass can include four parallel panels or any other suitable number of parallel panels. The steam circuit can include six passes and each pass can include a pair of parallel panels, wherein at least some of the pairs of parallel panels include panels that are substantially coplanar, and at least some of the pairs of parallel panels include panels that are oriented at an angle with respect to one another to form a boiler wall corner. It is also contemplated that the steam circuit can include eight passes.

In accordance with certain embodiments, a first portion of the panels are fluidly connected to one another by way of a first steam circuit or sub-circuit, and a second portion of the panels are fluidly connected to one another by way of a second steam circuit or sub-circuit. The boiler includes a first plurality of conduits each forming a portion of the first steam circuit fluidly connecting the panels of the first steam circuit, wherein the panels and conduits of the first steam circuit form a plurality of heat transfer passes in the first steam circuit. The boiler also includes a second plurality of conduits each forming a portion of the second steam circuit fluidly connecting the panels of the second steam circuit, wherein the panels and conduits of the second steam circuit form a plurality of heat transfer passes in the second steam circuit.

It is contemplated that in certain embodiments, at least one of the conduits is a cross-over conduit forming a portion of the steam circuit and fluidly connecting panels on a first one of the boiler walls to panels on a second one of the boiler walls opposite to the first one of the boiler walls. The steam circuit can include four passes of solar receiver panels with a first connector conduit fluidly connecting a first pass of panels with a second pass of panels, with a second connector conduit fluidly connecting a third pass of panels with a fourth pass of panels, and with the cross-over conduit fluidly connecting the second pass of panels with the third pass of panels. The first and fourth passes of panels can be on opposite boiler walls from one another, and the second and third passes of panels can be on opposite boiler walls from one another. It is also contemplated that each pass of panels can be on a separate boiler wall.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a side elevation view of an exemplary solar boiler panel constructed in accordance with the present invention, showing the planar configuration of the boiler tubes;

FIG. 2 is an interior elevation view of the solar boiler panel of FIG. 1, showing the planar configuration of the boiler tubes;

DETAILED DESCRIPTION OF THE PREFERRED EMBODIMENTS

Figure 3:
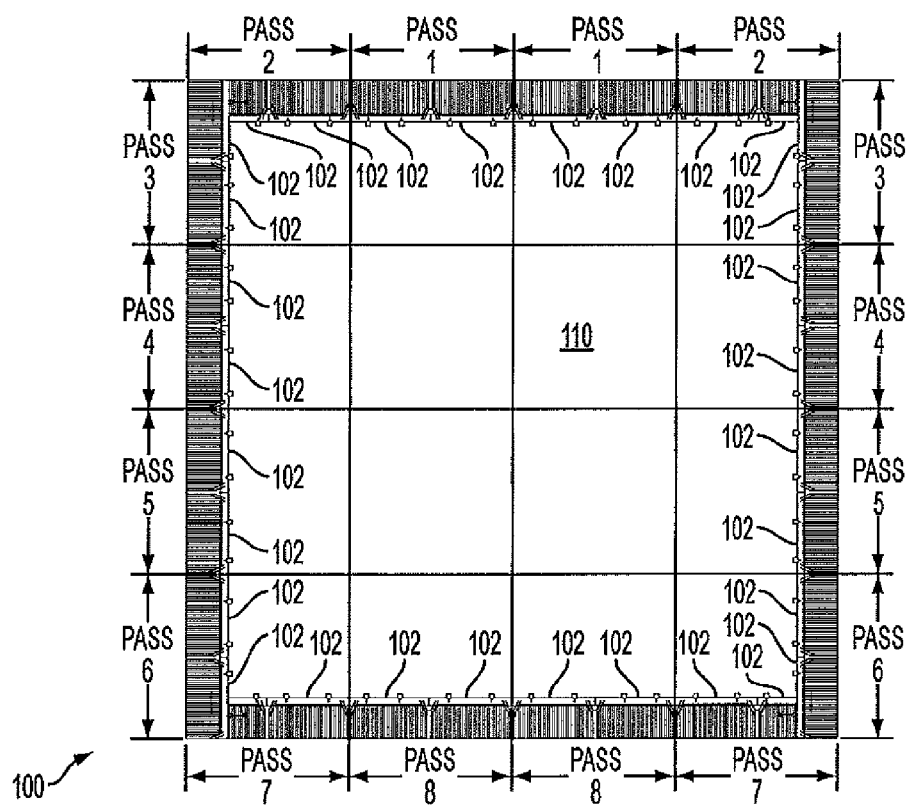
FIG. 3 is a plan view of a portion of an exemplary embodiment of a solar boiler constructed in accordance with the present invention, showing four boiler walls each having eight solar boiler panels as those shown in FIGS. 1 and 2, arranged side by side.

Reference will now be made to the drawings wherein like reference numerals identify similar structural features or aspects of the subject invention. For purposes of explanation and illustration, and not limitation, a partial view of an exemplary embodiment of a boiler in accordance with the invention is shown in FIG. 1 and is designated generally by reference character 100. Other embodiments of solar boilers in accordance with the invention, or aspects thereof, are provided in FIGS. 2-10, as will be described. The systems and methods of the invention can be used to improve control of boiler steam temperature, for example in solar power generation.

Fuel fired boilers generally have separate stages of superheaters and/or reheaters, usually called "low temperature" and "high temperature" stages. Each stage, or pass, has relatively uniform fluid conditions. That is to say that each boiler tube that makes up a pass has fluid at the same temperature and pressure (disregarding small variations due to temperature and flow unbalance).

A typical fuel fired boiler is segregated into passes for several reasons. First, mixing the fluid at the end of each pass allows any temperature unbalance to mix and create a uniform temperature. This is important because every tube in a pass does not have the same length and does not heat equally, therefore some tubes in a pass may end up hotter or colder than design specifications. Another reason to separate sections is to allow for attemperation of the entire steam flow between sections, which allows control of the steam temperature to a set condition.

Only a few stages are necessary in a typical fuel fired boiler because the heating in each pass is relatively uniform, and the tubes can be bent many times to allow for the proper amount of heating surface. This is possible because the majority of tubes in a typical fuel fired boiler transfer heat by convection. Hot molecules that make up the flue gas move from the combustion zone, the hottest area of the boiler, and carry energy through the boiler around the tubes of the convective heat transfer passes. Convective heat transfer works around the entire circumference of the tube, thus making the entire tube surface effective heat transfer area, because flue gas easily flows through the spaces between and around the tubes. This means that many tubes can be arrayed in-line with one another, filling the three-dimensional boiler space with tubes, and can still be effective at transferring heat from the flue gas to the steam contained within the tubes.

In a solar boiler, however, the heat transfer mechanism is via solar radiation. In order to transfer heat through radiation, the tube surface has to be directly exposed to the heat source. In order for a solar boiler tube to be effective at transferring heat, the tubes must be directly exposed, e.g., have a line of site, to the electromagnetic radiation from the sun. The heliostat mirrors surrounding a solar boiler serve to take the incident radiation from a large area and focus it onto the heat transfer tubes. Only the part of the tube that is exposed to this reflected sunlight constitutes an effective heat transfer surface, therefore in a solar boiler only about half of each tube is effective because the inactive portion is shaded by the boiler tube itself. The actual effective area is typically just less than one half of each tube due to the shading effects from nearby tubes.

Another important distinction of solar boilers is that there can only be one active row of tubes, since further rows of tubes in-line behind the active row would be blocked or shaded by the active row of tubes and would therefore be ineffective. This means that in order to increase beneficial heat transfer, solar boiler tubes should form a flat plane, rather than bending into the traditional pendent shape of fuel fired boiler tubes.

With reference to FIGS. 1 and 2, there are shown side and interior elevation views, respectively, of a solar boiler panel 102 of a solar boiler 100 constructed in accordance with the present invention. Boiler panel 102 has a plurality of tubes fluidly connecting an inlet header 113 to an outlet header 104. The tubes of boiler panel 102 form a planar solar receiver surface 107 and opposed internal surface 108. The exterior receiver surface 107 receives solar energy, for example from a field of heliostats, as indicated by the arrow in FIG. 1. As shown in FIG. 3, in boiler 100, eight panels 102 are be arranged end to end to form each boiler wall, and four boiler walls are be arranged to enclose an interior space 110 of boiler 100. Since the walls and panels are closely situated side by side, solar radiation is blocked from reaching interior space 110.

With this planar, single row configuration of solar boiler tubes, a boiler would have to be extremely tall and the tubes sufficiently long in order to transfer enough heat into a single row of tubes to achieve the necessary steam temperatures in a single stage such as a one-pass superheater or reheater. In Boiler 100, the tubes within each stage are advantageously further split into multiple passes.

Figure 4:
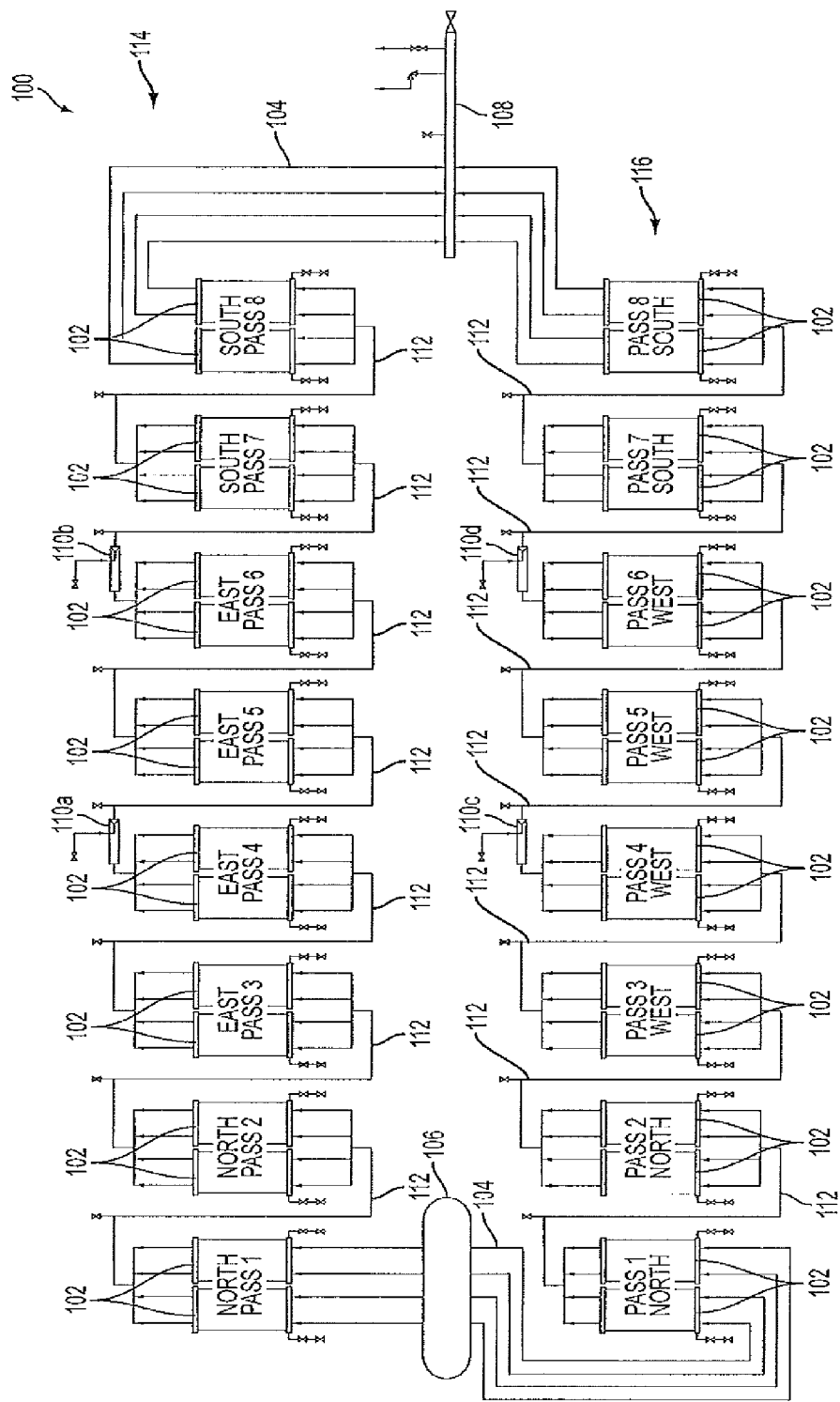
FIG. 4 is a schematic view of the solar boiler of FIG. 3, showing schematically two steam sub-circuits with eight passes each, as well as the placement of multiple spray stations for use in controlling temperatures of the receiver panels.
Figure 5:
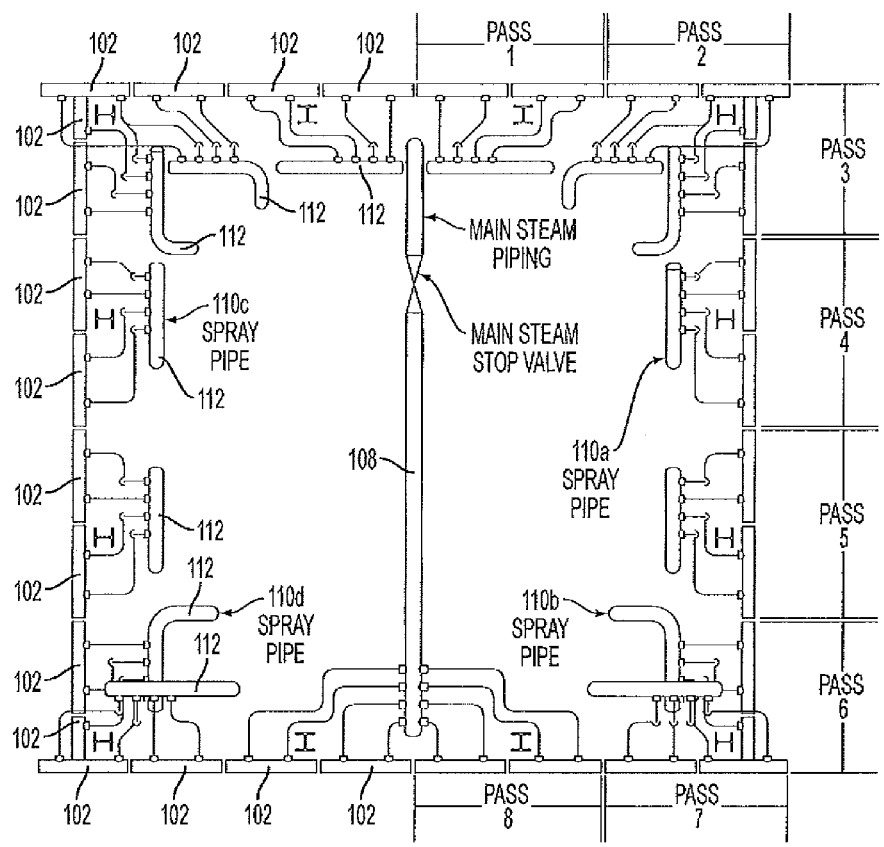
FIG. 5 is a schematic cross-sectional plan view of the solar boiler of FIG. 3, showing the locations of the eight passes in one of the two steam sub-circuits, and showing components in the boiler interior space.

Referring now to FIG. 4, the connections between panels 102 are shown schematically. Panels 102 are fluidly connected to one another by way of a steam circuit running from drum 106 to an outlet conduit 108, which leads, for example, to a steam turbine for power production. A plurality of conduits 112, each forming a portion of the steam circuit, fluidly connect between respective panels 102, such that panels 102 and conduits 112 form eight heat transfer passes in the steam circuit. Each pass includes two parallel panels 102. The steam circuit includes two sub-circuits, namely east sub-circuit 114, which is the upper sub-circuit as oriented in FIG. 4, and west sub-circuit 116, which is the lower sub-circuit as oriented in FIG. 4. FIG. 5 shows the arrangement of panels 102 surrounding interior space 110 with conduits 112 and other components therein.

Those skilled in the art will readily appreciate that the compass directions provided above and in FIG. 4 are exemplary only, and that any suitable orientations can be used without departing from the spirit and scope of the invention. It is advantageous to have the first passes after drum 106, which receive relatively cool steam, facing north if the location is in the Northern Hemisphere, since the heliostats to the north of boiler 100 will provide more direct radiation from the southern sun than will the heliostats south of boiler 100, which heat the last passes having the hottest steam. Four spray attemperation stations 110a, 110b, 110c, and 110d are provided in four respective conduits 112 to keep temperatures in the fifth through eighth passes of each sub-circuit in control.

Figure 6:
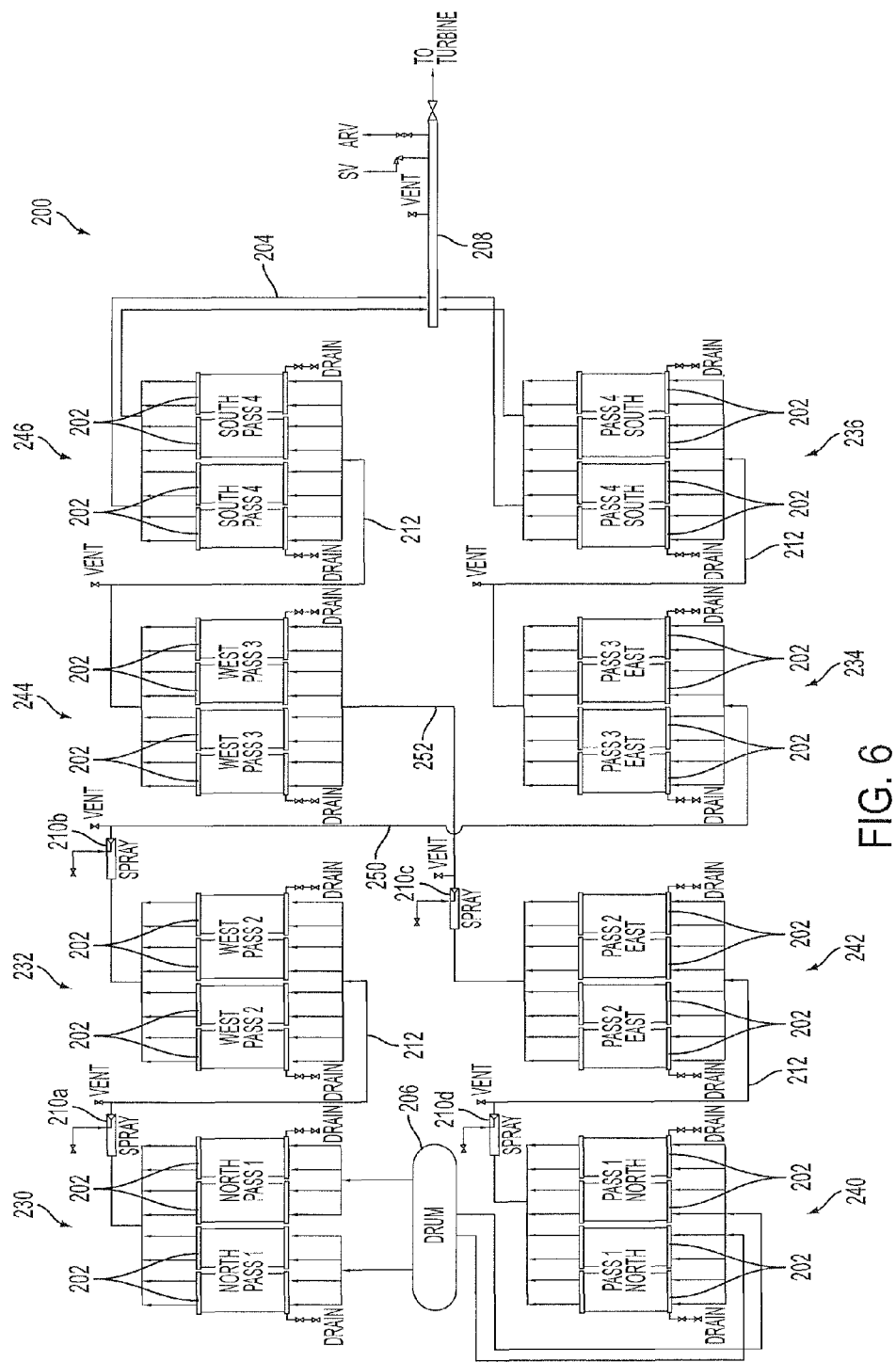
FIG. 6 is a schematic view of a portion of another exemplary embodiment of a solar boiler constructed in accordance with the present invention, showing schematically a cross-over, four-pass panel arrangement of two sub-circuits in a steam circuit.
Figure 7:
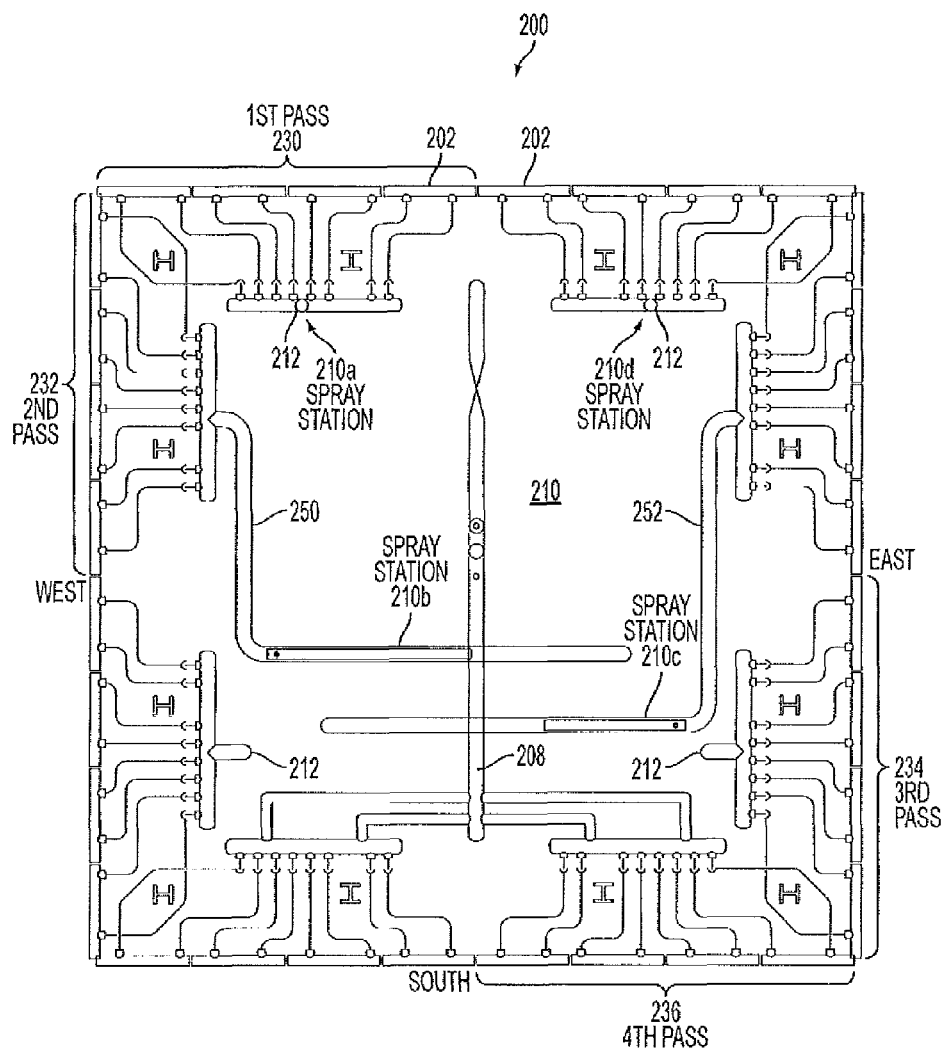
FIG. 7 is a schematic cross-sectional plan view of the solar boiler of FIG. 6, showing the locations of the four passes of the first sub-circuit of the steam circuit.
Figure 8:
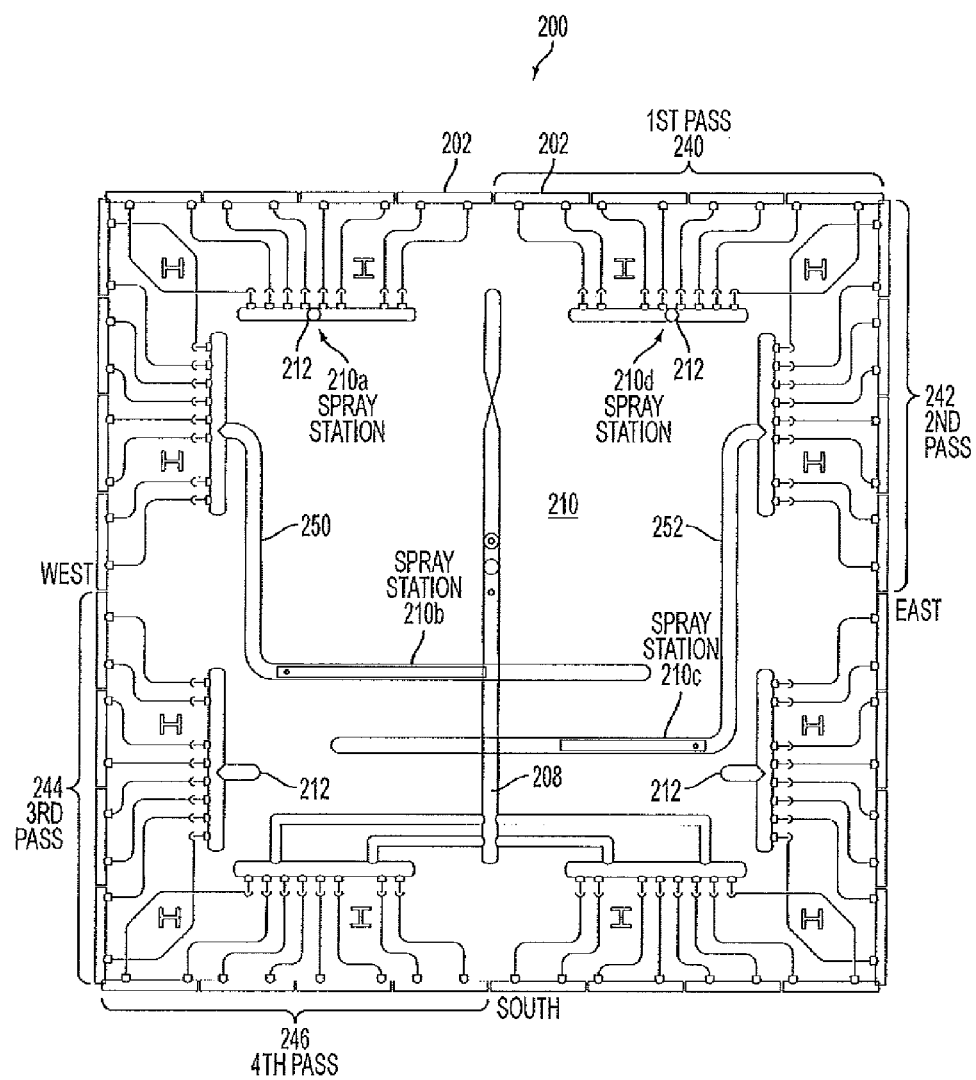
FIG. 8 is a schematic cross-sectional plan view of the solar boiler of FIG. 7, showing the locations of the four passes of the second sub-circuit of the steam circuit.

Referring now to FIG. 6, another exemplary embodiment of a solar boiler 200 in accordance with the invention is shown schematically. Boiler 200 includes a steam circuit running from a drum 206 through panels 202 to an outlet conduit 208 leading to a turbine, for example, and having spray attemperation stations 210a, 210b, 210c, and 210d much as described above. The steam circuit includes two sub-circuits, each sub-circuit including four passes each having four parallel, coplanar panels 202. The first and second passes of each sub-circuit are connected in series by a respective conduit 212, as are the third and fourth passes of each sub-circuit. The second and third passes of each sub-circuit are connected in series by a respective cross-over conduit 250, 252 leading to opposite sides of boiler 200 so that each circuit includes a pass on each of the four sides of boiler 200, e.g., a first pass on the North, one pass on the West, one pass on the East, and a forth pass on the South. FIG. 7 shows the locations of first pass 230, second pass 232, third pass 234, and fourth pass 236 of the first sub-circuit. FIG. 8 shows the locations of first pass 240, second pass 242, third pass 244, and fourth pass 246 of the second sub-circuit. An advantage of this cross-over configuration is that each sub-circuit receives substantially equal heat regardless of the sun's location in the sky (i.e., before or after solar noon), since each sub-circuit includes panels on all four sides of boiler 200.

Figure 9:
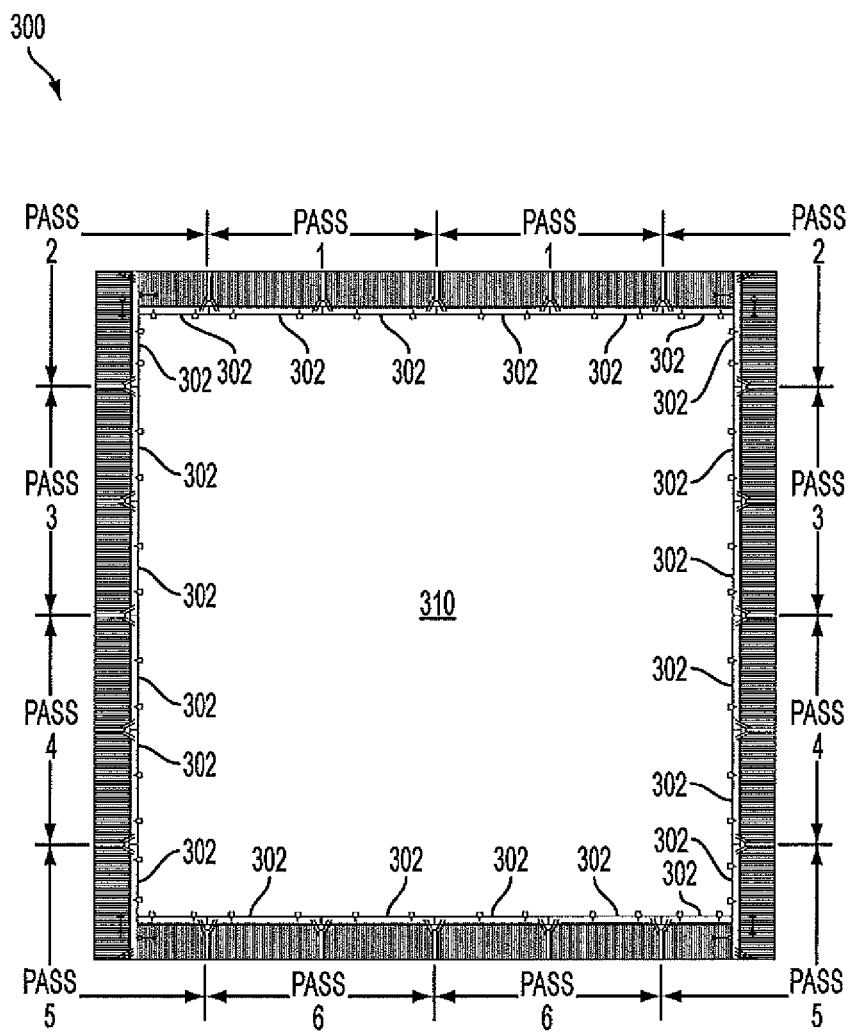
FIG. 9 is a plan view of a portion of another exemplary embodiment of a solar boiler constructed in accordance with the present invention, showing the panels of two steam sub-circuits, each having six passes.

With reference now to FIG. 9, the panel portion of another exemplary embodiment of a solar boiler 300 in accordance with the invention is shown in which the steam circuit includes two sub-circuits each having six passes. Boiler 300 includes four walls of panels 302 surrounding a boiler interior space 310, much as described above. Each of the four walls includes six panels 302. Each pass includes two parallel panels 302, and for the first, third, fourth, and sixth passes of each sub-circuit, the two panels 302 of each pass are arranged coplanar with one another. As shown in FIG. 9, the two panels 302 of the second and fifth passes of each sub-circuit are perpendicular to one another to form a corner of boiler 300.

The exemplary embodiments described above have four, six, or eight passes in two sub-circuits. Those skilled in the art will readily appreciate that any suitable number of sub-circuits and passes can be used without departing from the spirit and scope of the invention. It is contemplated that the advantages described herein can be attained using between two and ten passes, inclusively, depending on the specific application. Considerations in selecting a suitable number of passes include pressure drop, total steam temperature rise (i.e., temperature of the main steam less the temperature of the drum, where more passes are appropriate for higher temperature rises), and distribution of heat flux. Using multiple heat transfer passes reduces temperature imbalance, provides proper steam temperatures, and achieves desirable levels of pressure drop. If large variations in steam temperature arise in the tubes of the boiler panels, the short interval between passes allows mixing that equalizes temperatures.

Figure 10:
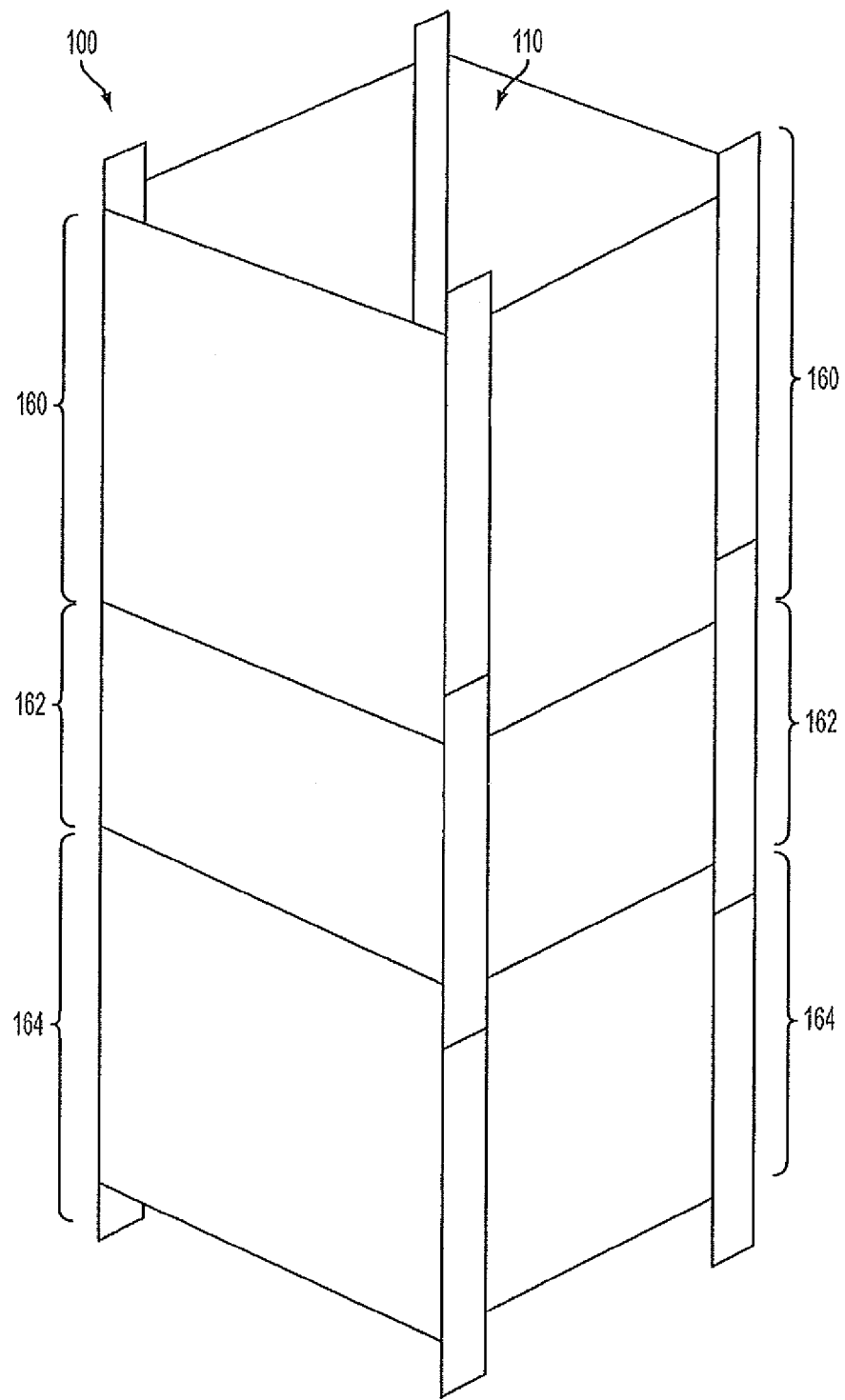
FIG. 10 is a schematic perspective view of an exemplary embodiment of a solar boiler constructed in accordance with the present invention, showing the stacking configuration of a steam generator section, a superheater section, and a reheater section wherein four boiler walls surround an interior boiler space.

With reference to FIG. 10, the multiple pass configurations described above can be used in stages as well. For example, solar boiler 100 includes a one-pass steam generator 162, an eight-pass superheater 160 configured as shown in FIG. 3 for supplying a high pressure turbine stage, and an eight-pass reheater 164, configured much as superheater 160, for supplying an intermediate/low pressure turbine stage. Reheater 164, steam generator 162, and superheater 160 are stacked and aligned as shown in FIG. 10 with reheater 164 on the bottom, steam generator 162 in the middle, and superheater 160 on the top. With the individual solar boiler panels 102 (not identified in FIG. 10, but see FIG. 3) in close alignment with one another both horizontally and vertically, the collective surfaces of the panels create four substantially solid receiver surfaces for receiving solar radiation from heliostats on all four sides of boiler 100. The walls can be arranged to face North, East, South, and West, respectively, for example, and boiler 100 can be placed on top of a central receiver tower in a heliostat field. With such a receiver configuration, a field of heliostats can surround boiler 100 in all compass directions to supply radiation for heating the working fluid. Some or all of the remaining components of system 100 can be shielded from the heliostats within interior space 110 of solar boiler 100, or can be located elsewhere in the solar boiler tower or on the ground.

The methods and systems of the present invention, as described above and as shown in the drawings provide for solar boilers with steam circuits having multiple passes. This provides improved ability to control boiler panel and steam temperature within safe and efficient limits. This also reduces temperature imbalance, provides proper steam temperatures, and achieves desirable levels of pressure drop. While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
   a) a plurality of boiler walls arranged end to end surrounding a boiler interior space, each wall including a plurality of side by side solar receiver panels, wherein the panels are fluidly connected to one another by way of a steam circuit; and
   b) a plurality of conduits each forming a portion of the steam circuit fluidly connecting the panels, wherein the panels and conduits form at least four heat transfer passes in the steam circuit, wherein each heat transfer pass is on a respective boiler wall and is separated from an adjacent pass by at least a horizontal component of the steam circuit, wherein a first pass is on an opposite one of the boiler walls from a fourth pass and a second pass is on an opposite one of the boiler walls from a third pass for substantially uniform heating of the steam circuit regardless of the position of the sun, and wherein at least one of the conduits is a cross-over conduit forming a portion of the steam circuit and fluidly connecting panels on a first one of the boiler walls directly to panels on a second one of the boiler walls opposite to the first one of the boiler walls, for fluid communication between the first one of the boiler walls and the second one of the boiler walls.

2. A boiler as recited in claim 1, wherein the steam circuit includes between five and ten passes, inclusively.

3. A boiler as recited in claim 1, wherein each pass includes four parallel panels, wherein the panels are substantially coplanar.

4. A boiler as recited in claim 1, wherein the steam circuit includes six passes.

5. A boiler as recited in claim 4, wherein each pass includes a pair of parallel panels, wherein at least some of the pairs of parallel panels include panels that are substantially coplanar, and at least some of the pairs of parallel panels include panels that are oriented at an angle with respect to one another to form a boiler wall corner, wherein a first pair of parallel panels are arranged to face North and South and a second pair of panels are arranged to face East and West.

6. A boiler as recited in claim 1, wherein the steam circuit includes eight passes.

7. A boiler as recited in claim 1, wherein the steam circuit includes a first connector conduit fluidly connecting the first pass with the second pass, with a second connector conduit fluidly connecting the third pass with the fourth pass, and with the cross-over conduit fluidly connecting the second pass with the third pass.

8. A boiler as recited in claim 7, wherein a first pair of parallel panels are arranged to face North and South and a second pair of panels are arranged to face East and West.

9. A boiler as recited in claim 1, wherein the steam circuit includes six passes, and wherein at least one pass includes a pair of parallel panels oriented at an angle to form a boiler wall corner.

10. A boiler for a solar receiver comprising:
    a) a plurality of boiler walls arranged end to end surrounding a boiler interior space, each wall including a plurality of side by side solar receiver panels, wherein a first portion of the panels are fluidly connected to one another by way of a first steam circuit, and wherein a second portion of the panels are fluidly connected to one another by way of a second steam circuit;
    b) a first plurality of conduits each forming a portion of the first steam circuit fluidly connecting the panels of the first steam circuit, wherein the panels and conduits of the first steam circuit form at least four heat transfer passes in the first steam circuit, wherein each heat transfer pass of the first steam circuit is on a respective boiler wall and is separated from an adjacent pass of the first steam circuit by at least a horizontal component of the first steam circuit, wherein a first pass of the first steam circuit is on an opposite one of the boiler walls from a fourth pass of the first steam circuit and a second pass of the first steam circuit is on an opposite one of the boiler walls from a third pass of the first steam circuit for substantially uniform heating of the first steam circuit regardless of the position of the sun;
    c) a second plurality of conduits each forming a portion of the second steam circuit fluidly connecting the panels of the second steam circuit, wherein the panels and conduits of the second steam circuit form at least four heat transfer passes in the second steam circuit, wherein each heat transfer pass of the second steam circuit is on a respective boiler wall and is separated from an adjacent pass of the second steam circuit by at least a horizontal component of the second steam circuit, wherein a first pass of the second steam circuit is on opposite one of the boiler walls from a fourth pass of the second steam circuit and a second pass of the second steam circuit is on an opposite one of the boiler walls from a third pass of the second steam circuit for substantially uniform heating of the second steam circuit regardless of the position of the sun; and
    d) a cross-over conduit forming a portion of at least one of the first and second steam circuits and fluidly connecting panels on a first one of the boiler walls to panels on a second one of the boiler walls opposite to the first one of the boiler walls, for fluid communication between the first one of the boiler walls and the second one of the boiler walls.

11. A boiler as recited in claim 10, wherein each steam circuit includes between five and ten passes, inclusively.

12. A boiler as recited in claim 10, wherein each pass includes four parallel panels, wherein the panels of each pass are substantially coplanar.

13. A boiler as recited in claim 10, wherein each steam circuit includes six passes.

14. A boiler as recited in claim 13, wherein each pass includes a pair of parallel panels, wherein at least some of the pairs of parallel panels include panels that are substantially coplanar, and at least some of the pairs of parallel panels include panels that are oriented at an angle with respect to one another to form a boiler wall corner, wherein a first pair of parallel panels are arranged to face North and South and a second pair of panels are arranged to face East and West.

15. A boiler as recited in claim 10, wherein each steam circuit includes eight passes.

* * * * *